(Model.) 2 Sheets—Sheet 1.
J. K. PRIEST.
Animal Clipper.
No. 233,695. Patented Oct. 26, 1880.
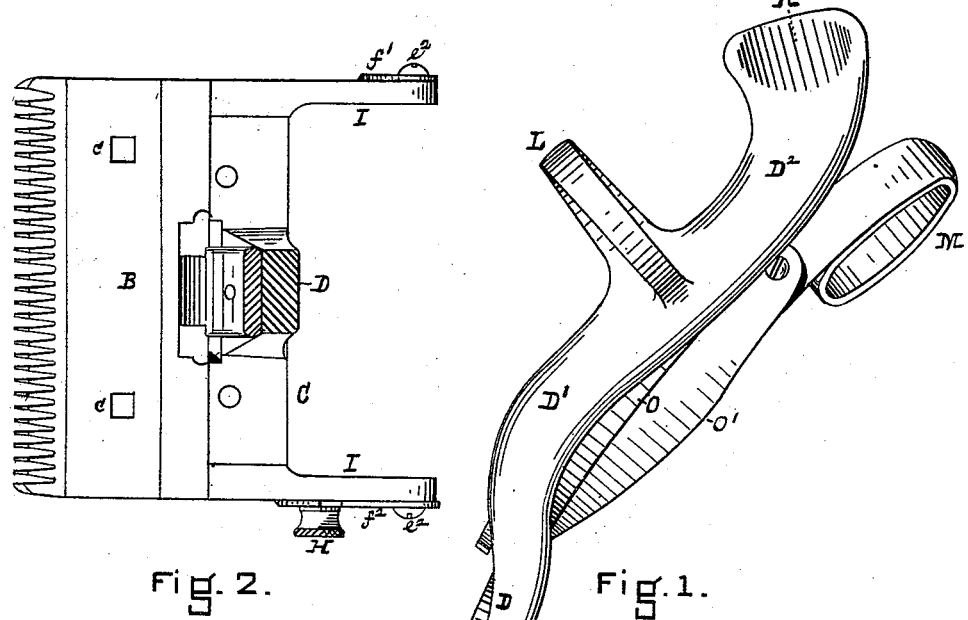
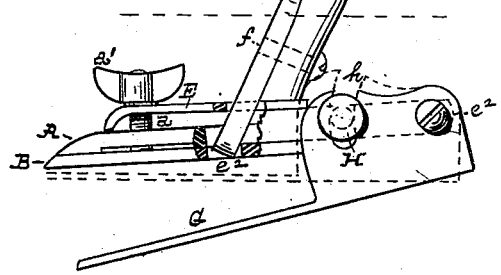
Fig. 2.  Fig. 1.
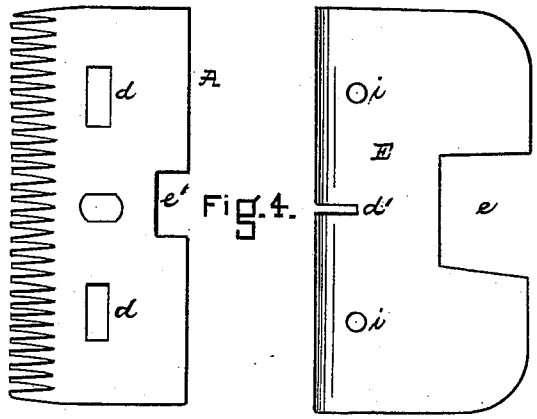
Fig. 3.  Fig. 4.
WITNESSES
W. C. Tilden
G. W. Flagler
INVENTOR
Joseph K. Priest
By Charles B. Tilden
Attorney (Model.)

2 Sheets—Sheet 2.

J. K. PRIEST.
Animal Clipper.

No. 233,695. Patented Oct. 26, 1880.

WITNESSES
Wm. Tilden
H. W. Flagler

INVENTOR
Joseph K. Priest
By Charles B. Tilden
Attorney

UNITED STATES PATENT OFFICE.

JOSEPH K. PRIEST, OF NASHUA, NEW HAMPSHIRE.

ANIMAL-CLIPPER.

SPECIFICATION forming part of Letters Patent No. 233,695, dated October 26, 1880.

Application filed July 21, 1880. (Model.)

*To all whom it may concern:*

Be it known that I, JOSEPH K. PRIEST, of Nashua, in the county of Hillsborough and State of New Hampshire, have invented certain new and useful Improvements in Instruments for Clipping and Cutting Hair, of which the following is a specification.

My invention relates to certain improvements upon Letters Patent of the United States numbered 220,416, dated the 7th day of October, A. D. 1879, said Letters Patent being issued to the American Shearer Manufacturing Company, of said Nashua, assignees, by mesne assignment, of all my right in said Letters Patent.

My invention consists in a certain novel construction and combination of parts, which will be fully described in the specification, and then specifically pointed out and defined in the claims.

Figure 5:
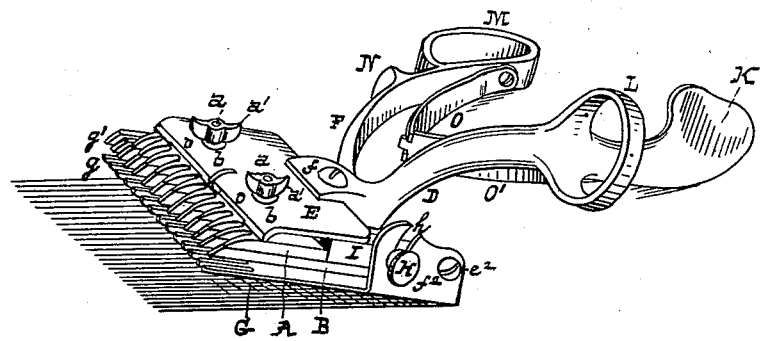
Figure 6:
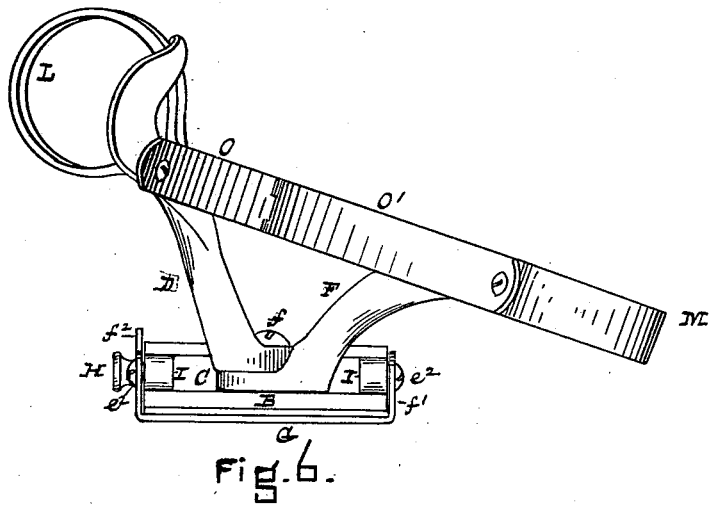

Referring to the drawings forming part of this application, Figure 1 is a side elevation of my invention. Fig. 2 is a plan view with the top plate shown in Fig. 1 removed and the handles not shown above the point where they intersect. Fig. 3 is a plan view of the cutter-plate detached. Fig. 4 is a plan view of the top plate detached. Fig. 5 is a perspective view of the whole instrument. Fig. 6 is an elevation taken from the rear.

A in said drawings indicates the toothed cutter-plate, which rests upon a similarly-toothed comb-plate, B. This comb-plate is firmly bolted to a block, C, the latter being cast solid with the arm D of the handle. (See Fig. 2.) Upon the upper surface of the block C rests the rear edge of a thin steel plate, E, having a notch, $e$, (see Fig. 4,) cut therein to permit the passage of the two handles D and F. The plate E projects forward, its edge being curved downward and resting upon the cutter-plate A just behind the point where the teeth join the plate. It is held in position by means of square bolts or pins $a\ a$, which pass upward through the perforations $c\ c$ in the comb-plate B, their heads resting against the under surface of said plate. They also pass through short slots in the cutter-plate A, (shown at $d\ d$, Fig. 3,) and their upper extremities, being rounded and threaded, project through the holes $i\ i$ in the plate E and receive washers $b$ and thumb-nuts $a'\ a'$. By turning these nuts the plate E may be caused to exert the necessary pressure upon the cutter-plate A to hold its cutting-teeth down upon the cutting-teeth of the comb-plate.

The plate E is partly cleft by a slot, $d'$, cut into its forward edge at the center thereof. The bearing-edge of the plate is divided thereby into two parts, and the slot $d'$ allows the two bearing portions to yield separately to the pressure exerted by the thumb-nuts $a'$. The bearing-edge of the plate is slightly cut away from a point near the slot $d'$ to a point not far from the end of the plate, as shown at $o\ o$, Fig. 5. By this construction the bearing of the plate E upon the cutter-plate A will be at three points only—viz., at each end and in the center.

Up to this point the instrument does not differ in any material respect from the invention shown in the Letters Patent issued to my assignees October 7, 1879.

The cutter-plate A is reciprocated by means of the arm F of the handle, which is laid upon the rigid arm D and a pivot-bolt, $f$, passed through both. The lower end of the arm F passes through the notch $e$ in the plate E, and through a short notch, $e'$, in the cutter-plate A, and extends downward into a slot, $e^2$, in the comb-plate B, said slot being long enough to permit the arm F to throw the cutter-plate A from one end of the comb-plate to the other. The extremity of the arm extends as far as the lower surface of the comb-plate, and is rounded off on a curve corresponding with the arc in which it vibrates.

In this class of instruments it is sometimes desirable to give the cutters a wider range of adjustment than is possible in the invention already patented to me. I have therefore devised means whereby the device may be gaged to cut at any distance from the skin, from one-fourth of an inch to an inch and a half range of adjustment.

Upon each end of the block C is cast or otherwise attached a steel bar, I, extending toward the rear to any suitable distance.

G indicates a steel plate lying under the comb-plate B, provided upon its edge with comb-teeth equal in number to the teeth on the comb-plate B, and corresponding in location or arrangement, the teeth $g$ on the plate G being directly beneath and registering with the teeth $g'$ on the comb-plate. At each of the two rearward angles of the plate G is an attaching-plate, (shown at $f'$ $f^2$ in Fig. 2.) These attaching-plates stand at right angles with the plate G, and one of them (indicated by the letter $f^2$) is considerably wider and longer than the other, to permit the formation therein of a curved slot, $h$. The plate G is pivotally attached to the ends of the steel bars I I by means of screws $e^2$ $e^2$. A set-screw, H, is set in the bar I at a point where it will engage with the slot $h$, the latter corresponding with the arc of a circle of which the screw $e^2$ is the center.

By turning the gage-plate G upon its pivotal attaching-screws its teeth may be set at any distance from the cutters, (within the range of adjustment,) and by turning up the set-screw H it will be retained in position. This adjustment is shown in Fig. 1 by the two positions of the plate, one being shown in broken lines and the other in full lines.

By pushing the teeth of the gage-plate G through the hair it will be lifted from the head and will fall at once between the teeth of the cutter and comb-plates. By the reciprocation of the former the ends projecting above the comb-plate will be clipped.

By allowing the teeth of the gage-plate to rest upon the skin it is evident that the cutters will uniformly operate at the same distance therefrom, and thus leave the hair of an equal length over the whole head.

In operating this instrument, in order to support it in proper position without fatigue to the hand, and at the same time vibrate the pivoted arm of the handle against the force of the springs, every attention must be paid to securing a firm grasp for the operator, which will enable him to support the weight of the device in the most natural and easy manner. To accomplish this result I have found it necessary to make the two arms of the handles of entirely different form. The arm D, which carries the comb-plate B, is curved toward the front, between the points D and D', Fig. 1. From this point it inclines gently toward the rear until, at or near the point D², it curves sharply upward, and the end is flared or widened, made thinner, and slightly concaved at the point K. At a point about midway between the end and the curve D' is formed a loop, L, which projects outward and upward from the arm. This loop is adapted to receive the thumb of the operator's right hand, and is so placed that when the thumb is inserted the concave portion K of this arm of the handle will lie against the inner surface of the broad base of the thumb where it joins the palm of the hand. When in this position the loop L will encircle the thumb at about the second joint. This form of arm not only affords an easy and natural grasp, but it enables the operator to keep the arm D substantially motionless, and to operate the cutters by the movement of the arm F only. This is a great advantage, as it prevents the cutting-plates from that unsteadiness and lateral vibration which always takes place in instruments having both handles move, and which results from their unequal action. The arm F of the handle curves from the pivotal point laterally outward, and is slightly bent upward to correspond with the curve D' of the arm D. It is somewhat shorter than the arm D, and is provided at its end with a loop, M, to receive the fourth or the third and fourth finger. Below this loop is formed (see Fig. 5) a guard, N, sufficient space being left between it and the loop M to receive the second finger. Springs O and O' are fastened to the arms D and F not far below their extremities, and these springs meet at their lower ends not far above the point where the arms intersect. A notch cut in the end of one spring and a point cut on the other serve to keep them in engagement. These springs spread the handles after they have been drawn together by the hand.

In clipping horses it is frequently necessary to clip the legs within a very short distance from the earth. As the hair grows downward, and as the instrument must therefore operate from below upward, a considerable difficulty has been experienced in using a hand-clipper, because the handles strike the floor before the cutters reach the end of the leg. To finish the operation it is necessary to lift the horse's foot up and hold it, and the moment this is attempted there is serious danger that the horse will kick. I have wholly obviated this difficulty by an extremely simple arrangement. (Shown in Fig. 1.) The cutting-plates A B are both arranged in a plane which meets the plane of the handles at an angle of about eighty degrees. By this construction the clipper may be used upon the feet and legs of a horse or upon the back of a person's neck with perfect convenience.

The instrument illustrated in Figs. 5 and 6 is intended more especially for barbers' use. In this pattern of instrument the handles are not set at so great an angle with the cutter-plates as is shown in Fig. 1. Moreover, in order to enable the barber to clip upon both sides of the head while standing behind the chair without an unnatural and painful flexion of the wrist-joint, I arrange the cutting-plates relatively to the two arms D F of the handles in the manner shown in Fig. 6. In this figure it will be noticed that a plane which passes through the comb-plate B will be cut by a second plane which passes through the ends of the handles D F at an angle of about thirty degrees. It will easily be seen that when standing behind the person to be operated upon, the operator can clip from the right side over to the left side of the head without turning the wrist as far as would be necessary if the ends of the handles were in a plane parallel with the cutter-plates.

Experience has demonstrated that this form of construction is of the greatest importance, as it enables the operator to clip over the whole head without the muscles becoming exhausted by being strained in unnatural positions.

Having thus fully described my invention, what I claim as new, and desire to secure by Letters Patent of the United States, is—

1. The combination, with the cutting-plates, of a rearwardly-projecting support, a gage-plate having comb-teeth pivoted to the extremity of said support, and a set-screw engaging with a slot in the gage-plate, whereby the latter may be adjusted and held at any suitable distance from the cutters, substantially in the manner and for the purpose set forth.

2. The combination, with a hair-clipping instrument, of a handle having one of its arms provided with a loop, L, and terminating in a flat or concaved upwardly-curved extremity, substantially as and for the purpose set forth.

3. A hair-clipping instrument consisting of a comb-plate, B, with a cutter-plate, A, reciprocating thereon, and operating-handles pivoted one upon the other, and having the axis of the pivot-bolt at a small angle with the cutter and comb plates, so that the said handles shall be at a considerable angle with said plates, substantially as and for the purpose set forth.

4. A hair-clipping instrument having its operating-handles connected with the cutting-plates, as described—viz., so that a line drawn through the extremities of the said handles and in their plane of motion shall make an angle with a line drawn from end to end of the cutting-plates of about thirty degrees, substantially as and for the purposes set forth.

In testimony whereof I have signed my name to this specification in the presence of two subscribing witnesses.

JOSEPH K. PRIEST.

Witnesses:
NATHANIEL EATON,
WM. E. SPALDING.